D. VANDERKOLK.
PERCH.
APPLICATION FILED JUNE 21, 1909.

968,817.

Patented Aug. 30, 1910.

Witnesses
J. H. Crawford
John A. Donegan

Inventor
Dewey Vanderkolk,
By
Attorneys

UNITED STATES PATENT OFFICE.

DEWEY VANDERKOLK, OF DAVID CITY, NEBRASKA.

PERCH.

968,817.  Specification of Letters Patent.  Patented Aug. 30, 1910.

Application filed June 21, 1909.  Serial No. 503,457.

*To all whom it may concern:*

Be it known that I, DEWEY VANDERKOLK, a citizen of the United States, residing at David City, in the county of Butler, State of Nebraska, have invented certain new and useful Improvements in Perches; and I do hereby declare the following to be a full, clear, and exact description of the invention, such as will enable others skilled in the art to which it appertains to make and use the same.

This invention relates to improvements in that class of devices constructed for the care of live-stock and has particular reference to a perch for chicken coops.

One object of the invention is the provision of a perch designed to trap the insects usually found on the bodies of fowls. It is well known that these insects readily leave the bodies of fowls while the latter are roosting and lodge in the crevices of the coop or between the latter and the ends of the perches. The present invention aims, therefore at the production of a perch which is constructed with a plurality of openings leading into a recess and into which the insects will go after leaving the bodies of the fowls and remain therein until the perch is removed from its position in the coop after which they may be readily shaken from the perch or the latter may be immersed in boiling water or an insecticide to kill the insects.

With these and other objects in view as will more fully hereinafter appear, the present invention consists in certain novel details of construction and arrangement of parts, hereinafter fully described, illustrated in the accompanying drawings and more particularly pointed out in the appended claim; it being understood that various changes in the form, proportion, size and minor details of the device may be made without departing from the spirit or sacrificing any of the advantages of the invention.

Figure 1:
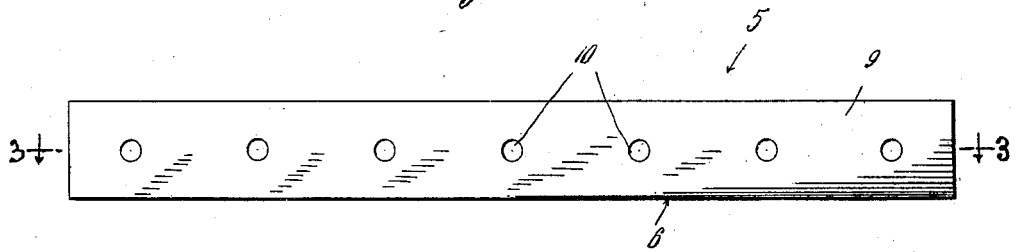
Figure 2:
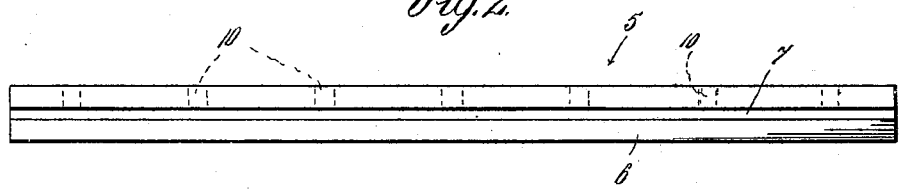
Figure 3:
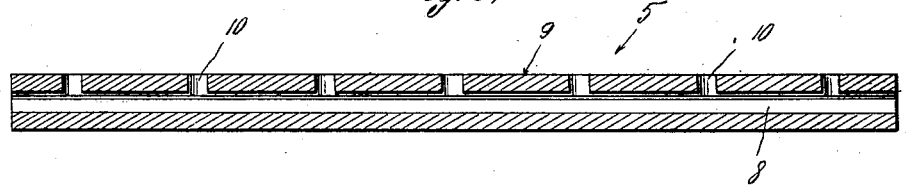
Figure 4:
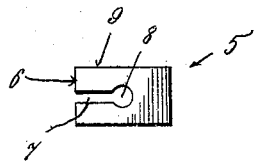

In the accompanying drawings forming part of the specification:—Figure 1 is a plan view of the device. Fig. 2 is a side elevation thereof. Fig. 3 is a longitudinal sectional view taken on the line 3—3 of Fig. 1. Fig. 4 is an end view of the device.

Similar numerals of reference are employed to designate corresponding parts throughout.

The perch may be of any suitable material, such as wood, and is preferably formed in one piece and of a length somewhat greater than the distance between the sides of the rack which is designed to support it in place and it is designed that the ends of the perch will be disposed adjacent the sides of the coop. The perch is designated in general by the numeral 5 and is rectangular in contour and cross section.

What will subsequently be termed the forward side of the perch is designated by the numeral 6 and is provided throughout its entire length with a medially disposed longitudinal recess 7, the depth of which corresponds to one-half the width of the perch, or substantially so. The recess may be of any desired width, but practice with this construction has shown, the best results are obtained when the width of the recess does not exceed one-eighth of the width of the side in which it is formed. The ends of the recess extend through the opposite ends of the perch and the inner side of the recess terminates in an annular bore 8 extending longitudinally of the perch and corresponding in length to the length of the latter.

By referring now to Fig. 1 it will be seen what will subsequently be termed the upper side of the perch is designated by the numeral 9 and formed in this upper side are a plurality of spaced openings 10, which are arranged along the central line of the upper face and terminate in the annular bore 8 extending through the center of the perch.

With this construction it is obvious that after the insects leave the bodies of the fowls they will enter the openings 10 or the recess 7 and will lodge within the latter or the bore 8 until the perch is detached from its support when they may be shaken from the perch, or the latter immersed in an insecticide, as before described.

From the foregoing it can be seen that I have provided a device which is comparatively simple in structure and inexpensive to manufacture and which may be applied to any form of chicken coop now in use.

Having thus described my invention what is claimed as new, is:—

The herein described perch comprising a bar having a longitudinal recess, open at one side of the bar from end to end of the latter and extending inwardly to about the center of the bar, a longitudinal bore with which the said recess communicates and spaced openings extending from said bore to the upper side of said bar.

In testimony whereof, I affix my signature, in presence of two witnesses.

DEWEY VANDERKOLK.

Witnesses:
A. H. ETTING,
E. K. CREW.